(12) United States Patent  
Niesten

(10) Patent No.: US 7,513,628 B2  
(45) Date of Patent: Apr. 7, 2009

(54) PROJECTION DEVICE WITH CAMERA TO PROVIDE FOR ITERATIVE ADJUSTMENTS

(75) Inventor: Maarten Niesten, Kirkland, WA (US)

(73) Assignee: Infocus Corporation, Wilsonville, OR (US)

( * ) Notice: Subject to any disclaimer, the term of this patent is extended or adjusted under 35 U.S.C. 154(b) by 393 days.

(21) Appl. No.: 11/282,298

(22) Filed: Nov. 17, 2005

(65) Prior Publication Data  
US 2007/0109506 A1 May 17, 2007

(51) Int. Cl.  
G03B 21/14 (2006.01)  
G03B 21/26 (2006.01)  
G03B 41/02 (2006.01)  
G03B 17/00 (2006.01)  
G02B 15/14 (2006.01)

(52) U.S. Cl. .................. 353/70; 353/101; 353/30; 359/354; 359/676; 352/105; 396/85

(58) Field of Classification Search .............. 353/70, 353/101, 30; 359/354, 676; 352/105; 396/85  
See application file for complete search history.

(56) References Cited

U.S. PATENT DOCUMENTS

| 6,877,864 | B1 | 4/2005 | Tamura et al. |
| 7,004,590 | B2 * | 2/2006 | Kitabayashi ............ 353/121 |
| 7,125,122 | B2 * | 10/2006 | Li et al. ................ 353/31 |
| 2005/0179875 | A1 | 8/2005 | Aoyanagi |

OTHER PUBLICATIONS

Han Chen, et al, "Scalable Alignment of Large-Format Multi-Projector Displays Using Camera Homography Trees," accessed Sep. 14, 2005, internet.

* cited by examiner

Primary Examiner—Diane I Lee  
Assistant Examiner—Magda Cruz  
(74) Attorney, Agent, or Firm—Schwabe Williamson & Wyatt

(57) ABSTRACT

An apparatus, system, and method for a projection device having a camera to provide for adjustments based at least in part on a series of captured images are disclosed herein.

11 Claims, 4 Drawing Sheets

PROJECTION DEVICE WITH CAMERA TO PROVIDE FOR ITERATIVE ADJUSTMENTS

FIELD

Embodiments of the invention relate generally to the field of projection devices, and more particularly to a projection device employing a camera for iterative adjustments of a projected image.

BACKGROUND

Multimedia projection systems have become popular for purposes such as conducting sales demonstrations, business meetings, classroom training, and for use in home theaters. Setting up a projection system often requires manipulation of the projection device to account for the relative positioning and dimensions of components of the projection system. This often requires manual adjustments to the components, which may reduce configuration accuracy, increase setup time, and decrease convenience. These challenges are particularly troublesome when a projector is used in different viewing environments, thereby necessitating continual reconfiguration.

BRIEF DESCRIPTION OF THE DRAWINGS

Embodiments of the invention are illustrated by way of example and not by way of limitation in the figures of the accompanying drawings, in which like references indicate similar elements and in which.

DETAILED DESCRIPTION

Illustrative embodiments of the present invention include a projection device with a camera to provide for iterative adjustments and methods practiced thereon.

Various aspects of the illustrative embodiments will be described using terms commonly employed by those skilled in the art to convey the substance of their work to others skilled in the art. However, it will be apparent to those skilled in the art that alternate embodiments may be practiced with only some of the described aspects. For purposes of explanation, specific materials and configurations are set forth in order to provide a thorough understanding of the illustrative embodiments. However, it will be apparent to one skilled in the art that alternate embodiments may be practiced without the specific details. In other instances, well-known features are omitted or simplified in order not to obscure the illustrative embodiments.

Further, various operations will be described as multiple discrete operations, in turn, in a manner that is most helpful in understanding the present invention; however, the order of description should not be construed as to imply that these operations are necessarily order dependent. In particular, these operations need not be performed in the order of presentation.

The phrase "in one embodiment" is used repeatedly. The phrase generally does not refer to the same embodiment; however, it may. The terms "comprising," "having," and "including" are synonymous, unless the context dictates otherwise.

The phrase "A/B" means "A or B". The phrase "A and/or B" means "(A), (B), or (A and B)". The phrase "at least one of A, B and C" means "(A), (B), (C), (A and B), (A and C), (B and C) or (A, B and C)". The phrase "(A) B" means "(B) or (A B)", that is, A is optional.

Figure 1:
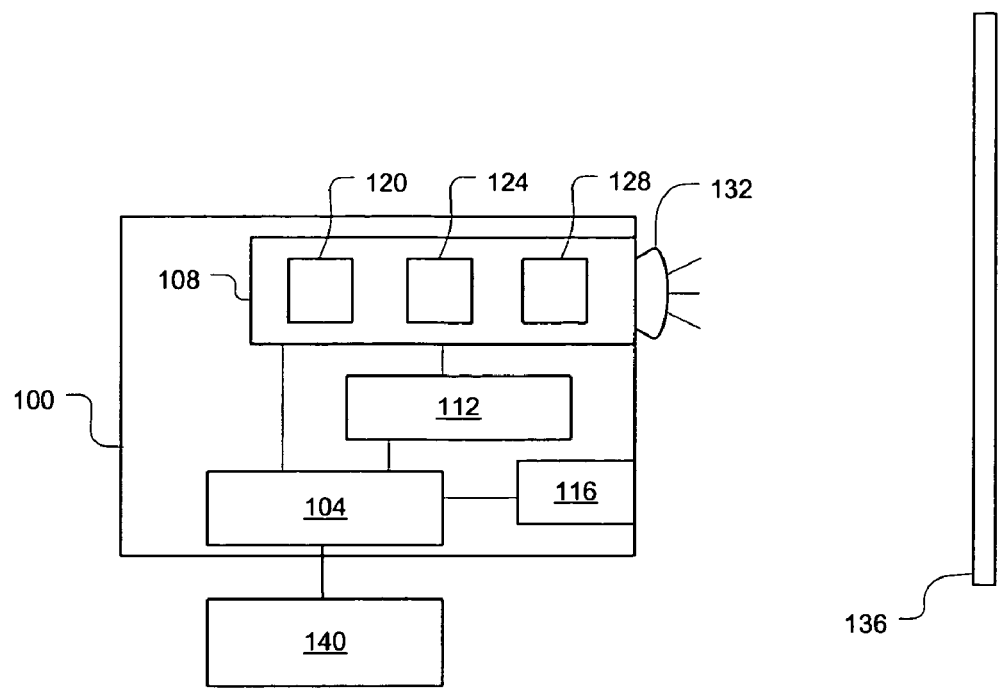
FIG. 1 illustrates a projection system in accordance with an embodiment of the present invention.

FIG. 1 illustrates a projection device 100 in accordance with an embodiment of the present invention. In this embodiment, the projection device 100 may include a controller 104 coupled to a projection arrangement 108, an adjustment mechanism 112, and/or an image capture device 116. The adjustment mechanism 112 may additionally be coupled to the projection arrangement 108, as will be described later in further detail.

In various embodiments, the controller 104 may be a microcontroller, a processor, an application-specific integrated circuit, etc. The controller 104 may represent a discrete unit or a number of control elements interoperatively coupled to one another in a manner to facilitate the operation of the components of embodiments of the present invention.

In various embodiments, the projection arrangement 108 may include a light source 120, illumination optics 124, a light modulator 128, and projection optics 132. The illumination optics 124 may facilitate the presentation of light from the light source 120 to the light modulator 128, which may be one or more displays such as a liquid crystal display, a digital micromirror device, a liquid crystal on silicon device, etc. The projection optics 132 may facilitate the projection of an image of the light modulator 128 onto a viewing surface 136.

In an embodiment the controller 104 may be coupled to a source unit 140 which may provide a source signal, e.g. a video signal, to the projection device 100. The controller 104 may receive the source signal from the source unit 140 and control one or more components of the projection arrangement 108, e.g., the light modulator 128, in a manner to project an image onto the viewing surface 136.

For the purpose of this description, a still image may be considered as a degenerate or special video where there is only one frame. Accordingly, both still image and video terminologies may be used in the description to follow, and they are not to be construed to limit the embodiments of the present invention to the rendering of one or the other.

In an embodiment, the projection device 100 may configure projection parameters based on the distance to, and properties of, the viewing surface 136. This configuration, which may take place prior to projecting an image based on the source signal, may include capturing a series of iterative images for use in adjusting parameters of the projection arrangement 108.

In an embodiment, the image capture device 116 may capture a series of iterative images, and transmit data representing the captured series of images to the controller 104. The controller 104 may control the adjustment mechanism 112 to provide one or more adjustments to the projection arrangement 108 based at least in part on the data representing the captured series of images provided to the controller 104 by the image capture device 116. In various embodiments, up to a plurality of adjustments may be based on each of the one or more captured images. In one embodiment, it may be that one or more adjustments are based on each of the captured images of the series of captured images except for the last-captured image. In this embodiment, the last-captured image of the series may provide evidence of an acceptable configuration of the projection parameters given the particular setup of the components.

In various embodiments, the image capture device 116 may include a charge-coupled device (CCD) and/or a complementary metal-oxide semiconductor (CMOS) device.

Figure 2:
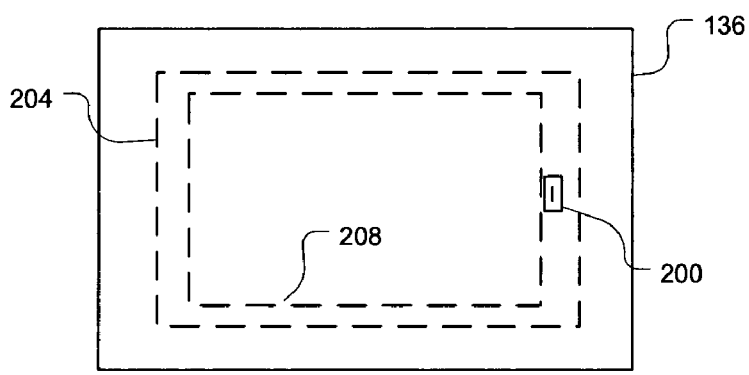
FIG. 2 illustrates a front view of a viewing surface with projected images of a number of adjustment iterations providing an adjustment to a zoom of a projection arrangement, in accordance with an embodiment of the present invention.

FIG. 2 illustrates a front view of the viewing surface 136 with projected images of a number of adjustment iterations providing iterative adjustments to a zoom of the projection arrangement 108, in accordance with an embodiment of the present invention. In this embodiment the viewing surface 136 may include a light switch 200. In an initial adjustment iteration the projection arrangement 108 may project an image 204. The image capture device 116 may capture an image including the projected image 204 and viewing surface 136 and transmit data representing the captured image to the controller 104. The controller 104 may analyze the data representing the captured image and detect whether there is a viewing obstruction within the outer boundary of the projected image 204, e.g., the light switch 200. Based at least in part on the detection of the light switch 200, the controller 104 may control the adjustment mechanism 112 to provide an iterative adjustment to the projection arrangement 108.

In an embodiment the adjustment mechanism 112 may be coupled to the projection optics 132 of the projection arrangement 108 and may adjust the zoom. An adjustment to the zoom of the projection optics 132 may increase/decrease the size of a projected image on the viewing surface 136.

In this embodiment, the iterative adjustment may be increasing the zoom of the projection optics 132 by a certain measure, which may decrease a projected image size. In the subsequent adjustment iteration the projection arrangement 108 may project an image 208, which is then captured by the image capture device 116. In analyzing the captured image data the controller 104 may determine that the light switch 200 is no longer a viewing obstruction. Thus an unobstructed area of the viewing surface 136 may be located and efficiently utilized for the projection of images by the projection device 100.

In the above-described embodiment, one iterative adjustment was provided by the adjustment mechanism 112 during one adjustment iteration. In other embodiments, more than one iterative adjustment may be done in a single adjustment iteration. For example, assume that an iterative adjustment to the zoom is done in a measured amount. If it is determined that a viewing obstruction will not be avoided by the adjustment of the zoom in this measured amount, more than one adjustment may be made prior to the next adjustment iteration, e.g., two iterative adjustments to the zoom may take place prior to a subsequent image capture.

Although the above-described embodiment discusses the presence of one viewing obstruction, e.g., the light switch 200, other embodiments may account for more than one viewing obstruction.

In general, a viewing obstruction may be considered as any nonuniformity viewable in the captured image that distracts from the viewing of a projected image. This may include, but is not limited to, a screen border (either between the viewing surface and a border on the screen or between the screen and the background, e.g., a wall), a physical obstruction, e.g., a chair, a picture, light switch, etc., a color change, and/or a texture change. In various embodiments a viewing obstruction may be interpreted consistent with the criteria and objectives of a particular embodiment. Furthermore, thresholds may be utilized to determine if a nonuniformity rises to the level of a viewing obstruction. For example, if a mark that is detectable in the captured image is below a certain size, it may be determined that the mark is not likely to distract from the viewing of the projected image and, therefore, should not be considered a viewing obstruction.

Figure 3:
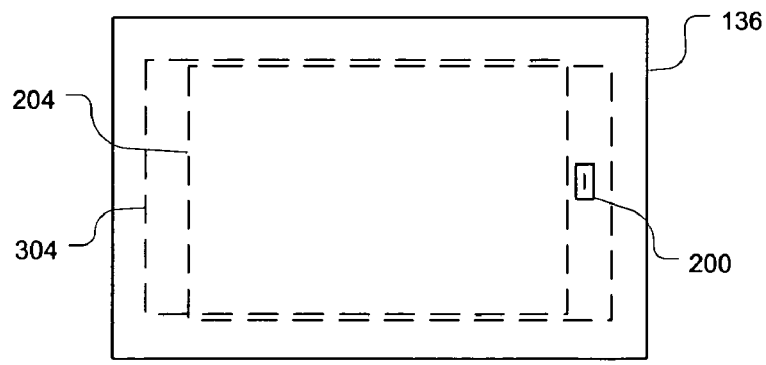
FIG. 3 illustrates a front view of a viewing surface with projected images of a number of adjustment iterations providing an adjustment to a projection direction of a projection arrangement, in accordance with an embodiment of the present invention.

FIG. 3 illustrates a front view of the viewing surface 136 with projected images of a number of adjustment iterations with an adjustment to a projection direction of the projection arrangement 108, in accordance with an embodiment of the present invention. In this embodiment, similar to the above embodiment, an initial adjustment iteration may include the projection arrangement 108 projecting an image 204 onto a viewing surface 136. The image capture device 116 may capture the projected image 204 and viewing surface 136 and transmit the captured image data to the controller 104. The controller 104 may analyze the captured image data and detect whether a viewing obstruction, e.g., the light switch 200, is within the outer perimeter of the projected image 204. Based at least in part on the detection of the light switch 200, the controller 104 may control the adjustment mechanism 112 to provide an iterative adjustment to the projection arrangement 108.

However, unlike the above embodiment, the iterative adjustment to the projection arrangement 108 may be to the projection direction, rather than to the zoom. The adjustment mechanism 112 may be coupled directly to one or more components of the projection arrangement, or may be coupled to the projection arrangement through, e.g., being more directly coupled to a projection chassis housing the projection arrangement 108. The adjustment mechanism 112 may include a mechanical actuator, e.g., a stepper motor, to facilitate the adjustment of the projection direction.

In this embodiment the adjustment mechanism 112 may adjust the projection direction in a horizontal manner. The approximate location of the light switch 200 may be determined, and the adjustment may result in the projected image being moved away from the light switch 200. In a subsequent adjustment iteration, the projection arrangement 108 may project an image 304, which has been shifted away from the light switch 200. The projected images 204 and 304 are shown in FIG. 3 as being vertically offset from one another for clarity. The projected image 304 and viewing surface 136 may be captured by the image capture device 116 and the controller 104 may determine that the light switch 200 is no longer a viewing obstruction.

While the above embodiments, discuss the adjustment mechanism 112 being a mechanical adjustment mechanism, in other embodiments it may additionally/alternatively be an electronic adjustment mechanism to electronically adjust the image zoom and/or direction.

In various embodiments the projection direction may be additionally/alternatively adjusted vertically and/or diagonally.

In various embodiments, a combination of iterative adjustments may be used to provide a less obstructed viewing area. For example, in one embodiment an initial iterative adjustment may be provided to the zoom while a subsequent iterative adjustment may be provided to the projection direction, or vice versa. The determination of which type of adjustment to make, and in which order, may involve consideration of the desired viewing size, location of the viewing obstruction, etc.

FIGS. 4-7 illustrate views of adjustment iterations including iterative adjustments to the projection direction and to the zoom in accordance with an embodiment of the present invention.

Figure 4A:
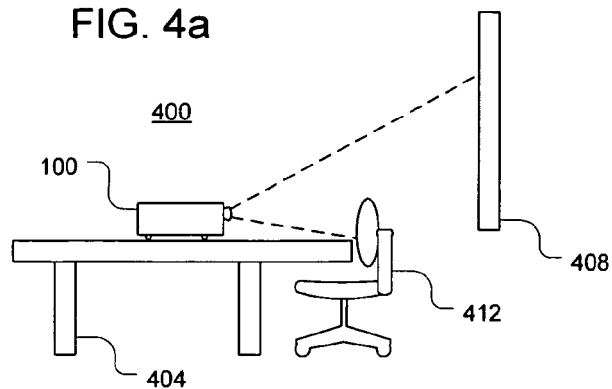
FIGS. 4-7 illustrate views of components and images from adjustment iterations providing iterative adjustments to the projection direction and to the zoom, in accordance with an embodiment of the present invention.

FIG. 4a illustrates a viewing environment 400 in which the projection device 100 may be employed, in accordance with an embodiment of the present invention. In this embodiment, the projection device 100 may be set on a table 404, generally directed toward a viewing surface, e.g., a screen 408, and powered on. A chair 412, adjacent to the table 404, may hinder a portion of the projected image.

Figure 4B:
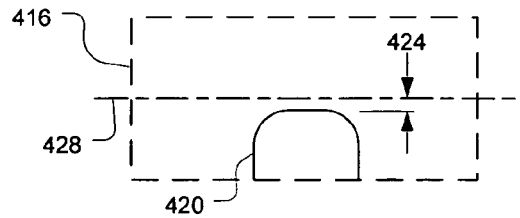

FIG. 4b illustrates a captured image 416 corresponding to the image projected by the projection device 100 in the viewing environment 400 depicted in FIG. 4a. In this embodiment, the captured image 416 may be captured and the controller 104 may detect a viewing obstruction 420, resulting from interference from the chair 412.

In this embodiment, the controller 104 may determine the approximate distance 424 of the viewing obstruction 420 to a reference point, e.g., centerline 428, which may or may not be part of the projected image. In one embodiment, the controller 104 may determine which type of iterative adjustment to make based at least in part on distance 424. For example, if distance 424 indicates that the viewing obstruction 420 is toward the perimeter of the captured image 416 then it may only take a small reduction to the size of the projected image to avoid the viewing obstruction and, therefore, one or more iterative adjustments may be made to the zoom. If, on the other hand, the distance 424 indicates that the viewing obstruction 420 is toward the middle of the captured image 416, adjusting the zoom to a point to avoid the viewing obstruction 420 may result in an unacceptably small image size. Therefore, in this embodiment, one or more iterative adjustments to the projection direction may be made. Also, in various embodiments, a combination of the adjustment types may be employed.

In the present embodiment, the controller 104 may determine that the viewing obstruction 420 is below the centerline 428 and is not towards the perimeter. Therefore, the adjustment mechanism 112 may adjust the projection direction by causing the projection device 100 to be tilted upward.

Figure 5A:
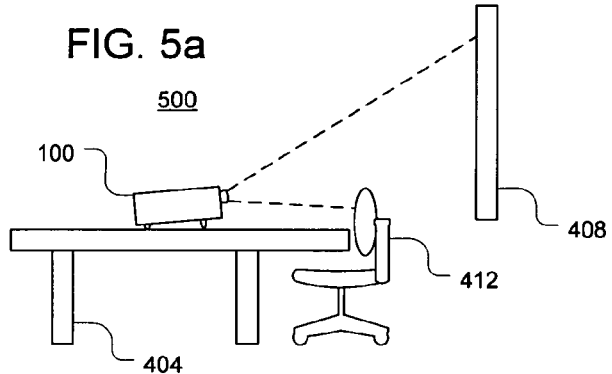
Figure 5B:
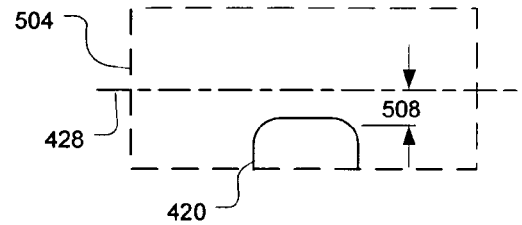

FIGS. 5a and 5b illustrate a subsequent adjustment iteration following the iterative adjustment of the projection direction, in accordance with an embodiment of the present invention. In this embodiment, as shown in the viewing environment 500 depicted in FIG. 5a, the projection device 100 has been tilted upward and may project an image. The image capture device 116 may capture an image 504 including the projected image and viewing surface 136. The controller 104 may detect the viewing obstruction 420 within the captured image 504 and approximate the distance 508 to the reference point, e.g., centerline 428. In this embodiment, the distance 508 may indicate that the viewing obstruction 420 is still too close to the centerline 428 to allow for avoidance of the obstruction to come from decrementing the image size. Therefore, the adjustment mechanism 112 may provide another iterative adjustment to the projection direction of the projection arrangement 108.

Figure 6A:
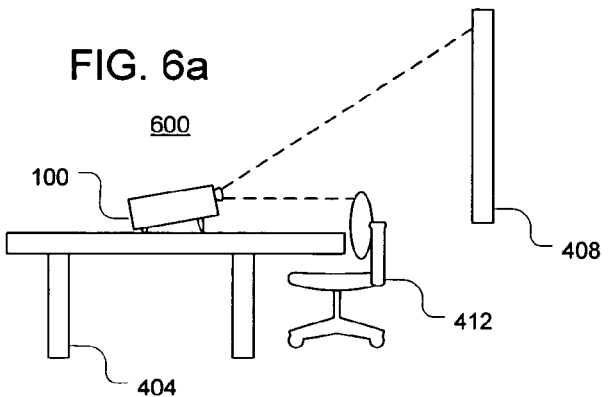
Figure 6B:
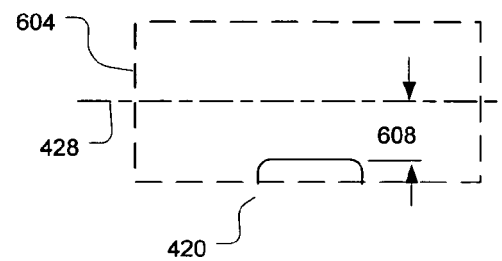

FIGS. 6a and 6b illustrate a subsequent adjustment iteration following the above iterative adjustment to the projection direction, in accordance with an embodiment of the present invention. In this embodiment, as shown in the viewing environment 600 depicted in FIG. 6a, the projection device 100 has been tilted upward and may project another image. The image capture device 116 may capture an image 604. The controller may detect the viewing obstruction 420 within the captured image 604 and approximate the distance 608 to the reference point, e.g., centerline 428. In this embodiment, the distance 608 may indicate that the viewing obstruction 420 is on the perimeter of the captured image 604. Therefore, in this embodiment the adjustment mechanism 112 may provide a subsequent iterative adjustment to the zoom, rather than to the projection direction.

Figure 7A:
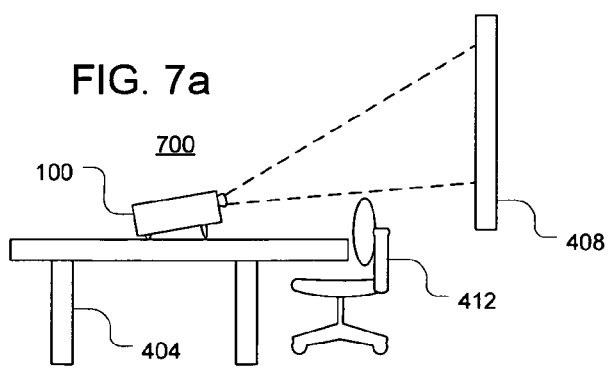
Figure 7B:
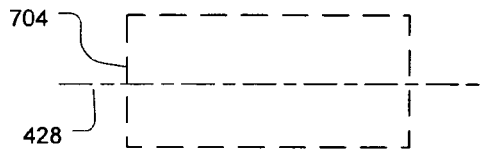

FIGS. 7a and 7b illustrate a subsequent adjustment iteration following the above iterative adjustment to the projection direction, in accordance with an embodiment of the present invention. In this embodiment, as shown in the viewing environment 700 depicted in FIG. 7a, the zoom of the projection device 100 has been adjusted. The projection device 100 may project an image, which may be smaller than a projected image of a previous iteration. The image capture device 116 may capture an image 704 that includes the projected image and the viewing surface 408. The controller may examine the captured image 704 and may detect no viewing obstructions located therein. The captured image 704 may represent that last of a series of captured images used to iteratively adjust the projection device 100 prior to projecting images for viewing on the viewing surface 408.

Figure 8:
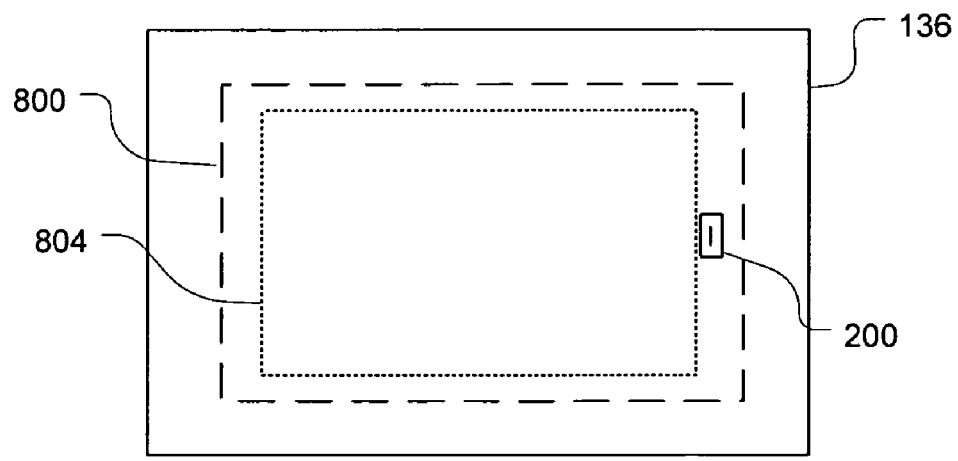
FIG. 8 illustrates a front view of a viewing surface with a projected image having a perimeter boundary, in accordance with an embodiment of the present invention.

In the above embodiment, the projected image may include the reference point as a horizontal centerline, a vertical centerline, or a perimeter boundary. FIG. 8 illustrates an embodiment where a projected image 800 includes a perimeter boundary 804. The perimeter boundary may represent the smallest acceptable viewing area and may be determined based on the throw distance between the projection device 100 and the viewing surface 136. In one embodiment, the throw distance may be determined based on a captured image, e.g., by measuring the image size, or by using a rangefinder, e.g., laser, radar, etc., included with the projection device 100.

In this embodiment, the controller 104 may determine that a viewing obstruction 420 is a perimeter obstruction, because it is located outside of the perimeter boundary 804. The adjustment mechanism 112 may perform one or more iterative adjustments to the zoom of the projection arrangement 108, reducing the size. In one embodiment, the size may be decremented until the viewing obstruction 420 is no longer detected.

While the above embodiments illustrate a projected image being reduced or shifted to avoid a viewing obstruction, other embodiments may additionally/alternatively include a projected image being expanded and/or shifted based on the absence of a viewing obstruction.

Figure 9:
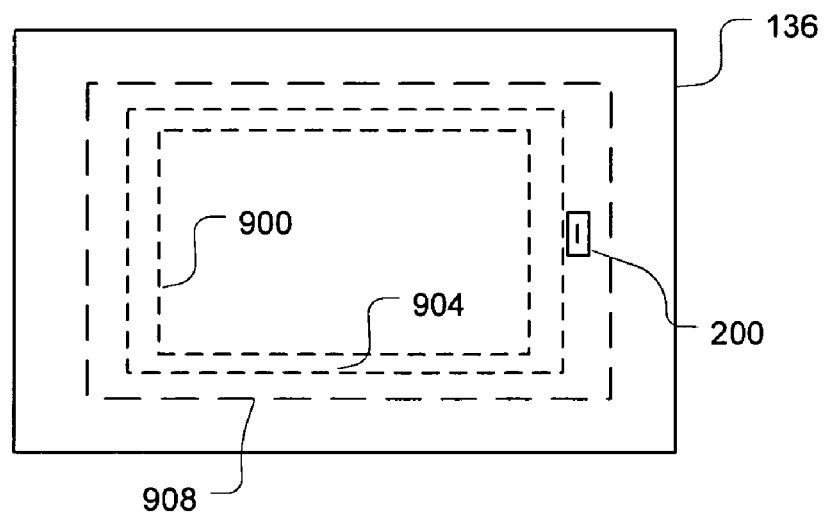
FIG. 9 illustrates a front view of a viewing surface with projection images of adjustment iterations having a zoom decremented, in accordance with an embodiment of the present invention.

FIG. 9 illustrates an embodiment providing iterative adjustments incrementing the size of the projected image, in accordance with an embodiment of the present invention. In this embodiment, the first adjustment iteration may project image 900. The controller 104 may examine the captured image and determine that there are no viewing obstructions within the projected image 900. Therefore, iterative adjustments to the zoom may be applied and subsequent projected images 904 and 908 may be captured. In this embodiment the controller 104 may detect the presence of the light switch 200 within the projected image 908. Therefore, the controller 104 may step back the zoom to the level that results in the projected image 904 that is free from viewing obstructions.

Figure 10:
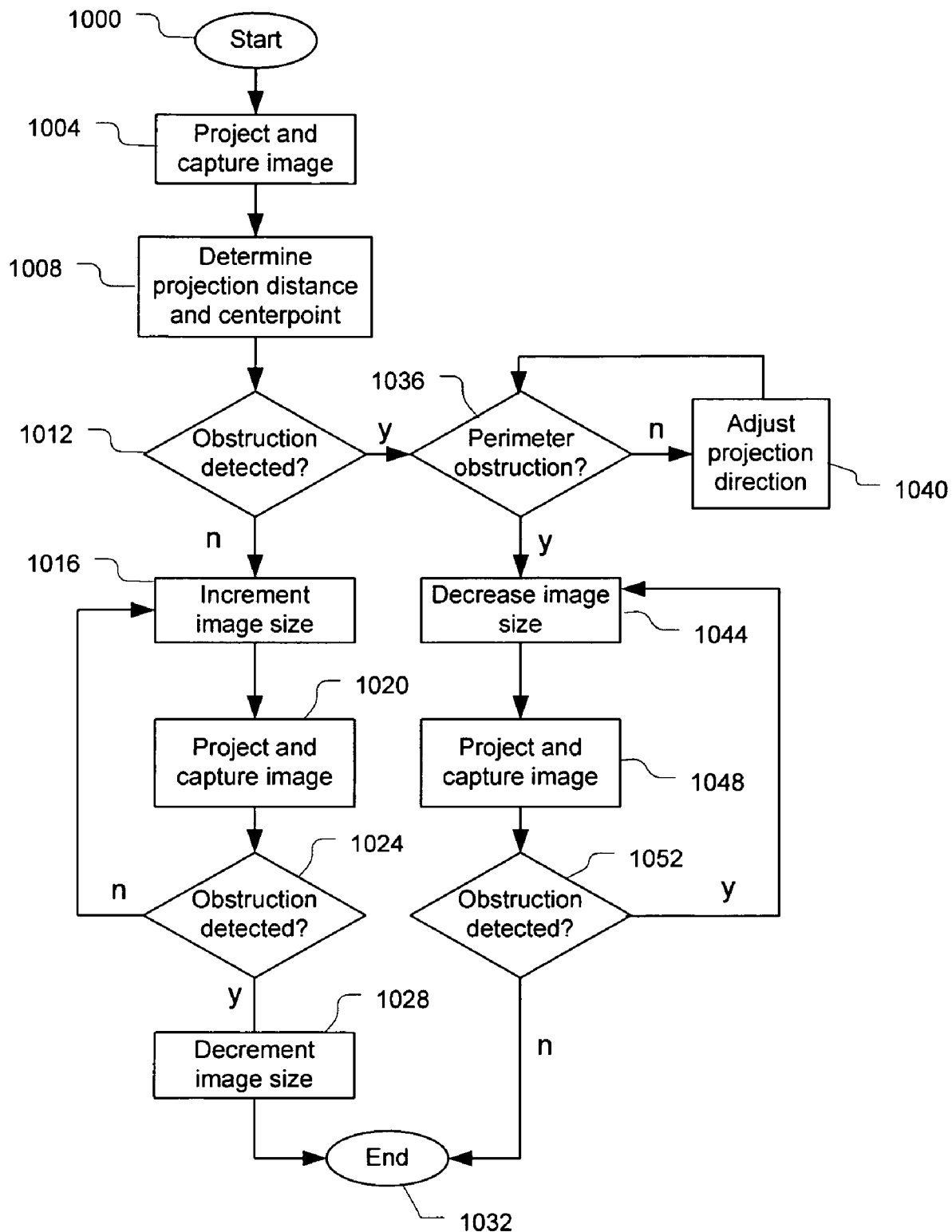
FIG. 10 illustrates an iterative adjustment process in accordance with an embodiment of the present invention.

FIG. 10 illustrates an iterative adjustment process in accordance with an embodiment of the present invention. In the following description, phases of the process may be identified by the numerals in parentheses. An iterative adjustment process may be initiated by a power-on event, movement of the projection device, obstruction of the projected image, etc. (1000). An image may be projected by the projection arrangement 108 and captured by the image capture device 116 (1004). In an embodiment, a throw distance and/or a reference may be identified (1008). The captured image may be analyzed to determine if a viewing obstruction is present within the projected image (1012). If there is no viewing obstruction detected, the adjustment mechanism 112 may provide an adjustment to the zoom of the projection optics 132 to increment the size of the projected image (1016). The projection arrangement 108 may project an image, which may be captured by the image capture device 116 (1020). The captured image may be analyzed to determine if a viewing obstruction is present within the projected image (1024). If there is no obstruction detected, the image size may be incremented again (1016). If there is an obstruction detected, the image size may be decremented (1028) and the iterative adjustment process may terminate (1032).

If an obstruction is initially detected (1012) a determination of whether it is a perimeter obstruction may be made (1036). If it is not a perimeter obstruction an adjustment to the projection direction may be made (1040). The adjustment direction may be based on approximate location of the obstruction, as discussed above. If the obstruction is on the perimeter, the image size may be decremented (1044). The projection arrangement 108 may project an image, which may be captured by the image capture device 116 (1048) and analyzed to detect for the presence of an obstruction (1052). If an obstruction is detected, the image size may be decremented (1044). If an obstruction is not detected, the iterative adjustment process may terminate (1032).

Although specific embodiments have been illustrated and described herein for purposes of description of the preferred embodiment, it will be appreciated by those of ordinary skill in the art that a wide variety of alternate and/or equivalent implementations calculated to achieve the same purposes may be substituted for the specific embodiment shown and described without departing from the scope of the present invention. Those with skill in the art will readily appreciate that the present invention may be implemented in a very wide variety of embodiments. This application is intended to cover any adaptations or variations of the embodiments discussed herein. Therefore, it is manifestly intended that this invention be limited only by the claims and the equivalents thereof.

What is claimed is:

1. An apparatus comprising:
   a projection arrangement to project one or more images onto a viewing surface;
   an image capture device to capture a series of images of the viewing surface and the one or more projected images;
   an adjustment mechanism coupled to the projection arrangement; and
   a controller coupled to the projection arrangement, the image capture device, and the adjustment mechanism and configured to detect a viewing obstruction in at least a first captured image of the captured series of images, and to control the adjustment mechanism to provide a first one of one or more iterative adjustments to the projection arrangement based at least in part on said detection of the viewing obstruction.

2. The apparatus of claim 1, wherein the controller is to control the adjustment mechanism to provide the one or more iterative adjustments prior to a subsequent projection of one or more images for viewing.

3. The apparatus of claim 1, wherein said controller is further configured to control the adjustment mechanism to provide the first one of the one or more iterative adjustments to the projection arrangement by providing for at least one adjustment to a zoom or projection direction of the projection arrangement.

4. The apparatus of claim 1, wherein the controller is further configured to determine an approximate location of the viewing obstruction, and to control the adjustment mechanism to provide the first one of the one or more iterative adjustments based at least in part on said determination of the approximate location.

5. The apparatus of claim 4, wherein the controller is further configured to control the adjustment mechanism to provide the first one of the one or more iterative adjustments to the projection direction and a second one of the one or more iterative adjustments to the zoom.

6. The apparatus of claim 1, wherein the controller is further configured to detect an unobstructed viewing area in at least the first captured image of the captured series of images, and to control the adjustment mechanism to provide the first one of the one or more iterative adjustments to the projection arrangement based at least in part on said detection of the unobstructed viewing area.

7. The apparatus of claim 1, wherein said image capture device comprises a charge coupled device and/or a complementary metal-oxide semiconductor device.

8. A system comprising:
   a source unit configured to output a source signal;
     a projection device coupled to the source unit and having
     a projection arrangement to project one or more images onto a viewing surface;
     an image capture device to capture a series of images of the viewing surface and the one or more projected images;
     an adjustment mechanism coupled to the projection arrangement; and a controller coupled to the projection arrangement, image capture device, and the adjustment mechanism and configured to detect a viewing obstruction in at least a first captured image of the captured series of images, and to control the adjustment mechanism to provide a first one of one or more iterative adjustments to the projection arrangement based at least in part on said detection of the viewing obstruction; and
   the projection arrangement to project a source image, based at least in part on the source signal, onto the viewing surface.

9. The system of claim 8, wherein the controller is to control the adjustment mechanism to provide the one or more iterative adjustments prior to a time when the projection arrangement is to project the source image onto the viewing surface.

10. The system of claim 8, wherein said controller is further configured to control the adjustment mechanism to provide the first one of the one or more iterative adjustments to the projection arrangement, by providing an adjustment to a zoom or projection direction of the projection arrangement.

11. The system of claim 8, wherein the source unit is a unit selected from the group consisting of a digital versatile disk player, a computing device, and a set-top box.

* * * * *